April 28, 1964   R. V. NISWANDER   3,130,976
ELASTOMERIC SEALING BUSHING
Filed May 29, 1961
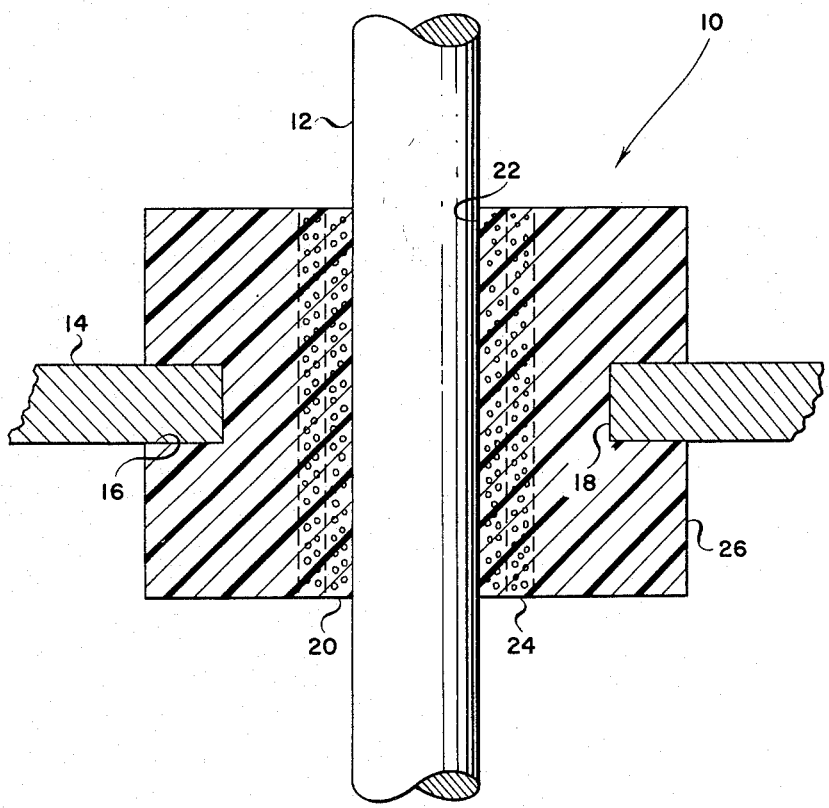
INVENTOR.
RICHARD V. NISWANDER
BY
Agent United States Patent Office 3,130,976
Patented Apr. 28, 1964

3,130,976
ELASTOMERIC SEALING BUSHING
Richard V. Niswander, Reseda, Calif., assignor to Lockheed Aircraft Corporation, Burbank, Calif.
Filed May 29, 1961, Ser. No. 113,172
1 Claim. (Cl. 277—188)

This invention pertains to elastomeric articles and more particularly to the surfaces of such articles.

A wide variety of different types of elastomeric articles are commonly used for bearing, gasket, sealing and various other related and similar uses. The efficiency of such articles for these purposes is well established by their wide utilization. In spite of this there is a very definite need for improvement in elastomeric articles used for various sealing, bearing, holding and other related purposes. Many elastomeric surfaces possess relatively high co-efficients of friction with respect to rigid materials such as metal, glass, plastics and the like. As a consequence of the characteristics of the surfaces of elastomeric articles these articles tend to adhere to rigid materials. This is frequently undesirable when relative motion between such rigid materials and such elastomeric articles is necessary.

This latter can be illustrated by referring to sealing bushings used in connection with aircraft cables in order to support such cables so that they can be moved with respect to a bulkhead or a wall in an aircraft structure. Such sealing bushings are commonly used in order to maintain air pressure on one side of such a wall or bulkhead while permitting a cable to be moved therethrough for various control purposes or related purposes. As such bushings are constructed at the present time the elastomeric surfaces on them which are in contact with cables are of such a character as to tend to oppose relative movement of such cables to what is considered to be an unnecessary and undesirable extent. In many cases power amplification means such as hydraulic cylinders must be utilized in order to move such cables with respect to such sealing bushings. Such power amplification means are undesired because of weight, cost and other analogous considerations. They are also undesired because when they are used an operator cannot satisfactorily "feel" the operation of a part attached to such a cable as the cable is moved.

The manner in which the surfaces of elastomeric article grasp or hold rigid members so as to oppose relative movement between such articles and such members is, of course, encountered in many fields other than aircraft manufacture. For example, in the automobile field elastomeric gaskets hold glass panels so as to make replacement of such panels relatively difficult and laborious. Similar problems are encountered virtually wherever elastomeric gaskets or sealing strips are used in conjunction with metal surfaces or other rigid surfaces.

It is considered that such problems in obtaining relative movement between an elastomeric article and a rigid member are, to a large extent, a consequence of the fact that elastomeric materials are "plastics" in a broad sense of the term, in that such elastomeric materials will tend to "flow" with respect to a rigid member when held under compression in contact with such a member. Such flow is considered normally to tend to cause a certain amount of "bonding" between the elastomeric article and the rigid member. This bonding has long been recognized to be a significant problem with certain common types of elastomers such as, for example, polychloroprene compositions; but it is encountered in various degrees with virtually all elastomers. It is considered that such bonding is frequently primarily of a physical-mechanical character, but it is entirely possible that in many circumstances it may be accomplished by a chemical type of bonding action.

An object of the present invention is to provide new and improved elastomeric articles having surfaces with low friction characteristics, which can be used to overcome the problems, briefly suggested above, which result from the relatively high co-efficients of friction of the surfaces of conventional elastomeric articles which result from the tendency of such conventional articles to "flow" and "bond" in varying degrees. A more specific object of this invention is to provide, in elastomeric articles, surface structures of so-called "antifriction" character which serve to protect against such articles adhering to rigid members in contact with them, and which facilitate relative movement between such articles and such rigid members. A further object of the present invention is to provide elastomeric articles having surfaces as briefly indicated in the preceding which may be easily and conveniently manufactured with comparatively minor expense.

These and various other objects of this invention, as well as many specific advantages of it, will be more fully apparent from a detailed consideration of the remainder of this specification including the appended claims and the accompanying drawings which illustrate, in cross-sectional view an article utilizing this invention.

The accompanying drawing is intended to clearly illustrate the general structure of elastomeric articles having surfaces in accordance with this invention. It will be realized that the surfaces of such articles constitute the subject matter of this invention, and that elastomeric articles utilizing surfaces as herein described may be constructed in a wide variety of sizes, shapes, and configurations for different uses. For these reasons this invention is to be considered as being limited solely by the appended claims forming a part of this disclosure.

As an aid to understanding this invention it can be stated in essentially summary form that it concerns elastomeric articles, each of which includes a central portion or base layer of an elastomeric composition, a transition layer located upon the central portion or base layer, and a surface layer of "antifriction" character located upon this transition layer. In an article of this invention the elastomeric composition in the main body portion or base layer is utilized in the transition and surface layers to hold in these latter layers different concentrations of solid lubricating particles.

Although the foregoing summary indicates the general character of elastomeric articles having surface structures in accordance with this invention it does not fully define the actual nature of this invention. Articles as herein described utilize known elastomeric compositions based upon known elastomers such as (1) natural rubber; (2) butadiene polymers and copolymers; (3) isobutylene polymers; (4) chloroprene polymers; (5) organic polysulfide elastomers; and (6) organo-silicon polymers of the so-called silicone and related types. These elastomeric compositions are preferably formed in accordance with known practice so as to contain known antioxidants, antiozonants, plasticizers, softeners, extenders, pigments and compounding ingredients such as carbon clays, or various inorganic or organic materials such as calcium carbonate, various types of clay and the like. Preferably the elastomeric composition in an article of this invention is compounded so as to have substantially the same physical properties as a similar article not constructed in accordance with the present invention.

From the foregoing it will be understood that the present invention does not concern the physical and chemical structure of the base or central portion of an elastomeric article. It concerns the utilization within such an article of solid lubricant particles which are physically held by the elastomer so as to provide on the surface or surface layer of the elastomeric article a relatively high proportion of surface area of "antifriction" or low friction character. Such solid lubricating particles preferably are also used in the transition layer immediately between the base portion of the elastomeric article and the surface or surface layer so as to provide a gradual transition in physical properties between the surface layer and the base portion of the elastomeric article.

The solid lubricant particles used with this invention preferably are of a type commonly recognized to have low co-efficients of friction. They are also preferably selected from various compositions which are not so miscible with such above-indicated elastomer ingredients as to blend into elastomeric compositions, as briefly discussed above, so as to lose their identity. Preferably such solid lubricant particles are also of a type which is substantially unaltered by the temperatures normally encountered during the vulcanization or polymerization to a usable article of the particular elastomeric composition with which they are used. It is presently considered that preferred results can be achieved utilizing solid lubricant particles selected from the group consisting of polytetrafluoroethylene particles, molybdenum disulfide particles and graphite particles. If desired, the surfaces of such particles can be treated so as to be of an irregular or etched character to improve the physical adhesion or holding action between elastomeric compositions and such particles.

In general, the higher the proportion of the solid lubricant particles in a surface layer of a complete article of this invention, the lower the physical strength of such layer and simultaneously the lower the composite coefficient of friction of the surface. Because of this, it is generally preferred to utilize in such a surface layer so high a proportion of solid lubricant particles as can be put into the layer without affecting the physical strength of such surface layer to the point where it is easily damaged by abrasion or the like. At the present time it is believed that a surface layer as indicated in the preceding should contain from about 50% to about 80% by weight of solid lubricant particles, as herein described, in order to obtain the benefits indicated herein.

The size of such particles, of course, is also related to the proportion of such particles used and to the physical strength achieved in a surface layer as herein described. In such a layer the particles preferably are held separate and apart from one another by a lattice-work type of structure derived from the elastomeric composition, which structure contains essentially separate, distinct pockets, each of which contain a lubricant particle. If these particles are undesirably small they do not exhibit sufficient surface on the surface layer to provide the desired low friction characteristics, inasmuch as they are substantially covered by the elastomeric composition. If, on the other hand, there particles are overly large the elastomeric composition used does not surround them sufficiently so as to achieve the desired type of physical holding action, and as a consequence of this these particles are apt to escape from the surface layer, as during abrasion. At present it is considered that satisfactory results can be achieved utilizing solid lubricant particles ranging in size from particles which will pass an 80 mesh standard Tyler screen to particles which will not pass a standard 325 mesh standard Tyler screen. It is presently considered that best results are achieved utilizing particles having non-round, irregular surfaces.

The depth of a surface layer containing solid lubricant particles as indicated also relates to the ultimate performance of a complete elastomeric article formed in accordance with this invention. In general, the surface layer on such an article containing solid lubricant particles should be substantially uniform in composition throughout its depth, and should be sufficiently thick so that the loss of some of the solid lubricant particles from its surface, as by abrasion or the like, does not destroy the low friction characteristics of the exposed surface of the surface layer. Also, the thickness of the surface layer preferably should be sufficiently small so that the surface layer does not significantly affect the elastomeric character of the base portion of the article, particularly when the article is used for purposes where the elastomeric character of the article is of primary importance.

The thickness of the surface layer also is considered to be related to the ability of the surface layer to resist any tendency of the elastomeric composition in the article to "flow" or "creep" so as to form a physical type of bond to a rigid surface placed in contact with it for a prolonged period. In general, this surface layer should be sufficiently thick so that the "plastic" properties of the elastomeric composition in it are effectively restricted by the solid lubricant particles so that at most only comparatively thick films of this elastomeric composition can ever be presented at the exposed surface of this surface layer in a position where any tendency toward physical or related bonding might occur.

Because of the number of these considerations and the difficulty of experimental work in determining the precise optimum thickness of a surface layer in an article of this invention for each possible application with every known type of elastomeric composition it is considered impossible to precisely specify the thicknesses of all possible surface layers, as herein described, on the basis of thickness dimensions of a critical nature founded on test data. In general, it is believed that surface layers as herein described should be at least 0.015 inch thick in order to achieve the various desired results indicated in the preceding paragraph. It is also considered that such surface layers should be no thicker than about 0.030 inch in order to avoid creating upon the surface of a complete elastomeric article as herein described a relatively "rigid" surface layer serving to detract from the ultimate elastomeric properties needed in a complete article as herein described.

It is presently considered that the transition layer located between the surface layer and the central portion or base layer of an elastomeric article as herein described should extend from about 0.030 to about 0.040 inch in thickness or depth. It is believed that a transition layer falling within this range of depths is desirable since it provides a gradual change or transition in physical properties between the base portion of the elastomeric composition in an article and a surface layer which contains solid lubricant particles, by providing a gradual shift in physical structure from a structure containing substantially no solid lubricant particles, adjacent to the central portion or base, to a region contiguous with the surface layer having substantially the same proportion of solid lubricant particles as are found in this surface layer. This is considered desirable as providing in an article as herein described a layer which gradually varies in physical character between the relatively rigid structure in the surface layer resulting from the presence of solid lubricant particles, to the flexibility inherent in an elastomeric composition employed in the central portion or base layer. As a consequence of this gradual variation in physical properties between the base portion and the surface layer, temporary deformation, bending or the like of a complete article as herein described is not considered to result in undue stresses and strains being created between the surface layer and the base portion. By minimizing such stresses and strains it is considered that any tendency for the surface layer to separate or part from the central portion or base layer is effectively minimized.

In the drawing there is shown a sealing bushing 10, constructed in accordance with this invention, for use in supporting a movable control cable 12 with respect to a bulkhead or wall 14. This bushing is generally cylindrical and is provided with an external peripheral groove 16 which is adapted to be snapped into a hole 18 in the bulkhead or wall 14 in accordance with conventional practice. The bushing 10 differs from prior related bushings of a similar character by utilizing a surface layer 20 defining an internal cylindrical hole 22, and by utilizing a transition layer 24 which connects this surface layer 20 with the base portion 26 of the bushing 10. As shown, the cable 12 extends through the hole 22 and the bushing 10 preferably resiliently engages the exterior of the cable 12. When the bushing 10 is constructed as illustrated, a seal is effectively created with respect to the exterior of the cable 12. Because of the surface characteristics of the surface layer 20 this cable may always be moved with respect to the bushing 10 with a minimum amount of difficulty, and the bushing 10 does not tend to bond with or otherwise adhere to the cable 12 to any significant or material extent, even when the cable 12 is not moved with respect to the bushing 10 for a prolonged period.

Although the principal portion 26 of the bushing 10 may be formed out of a wide variety of different elastomeric compositions of the type indicated in the preceding discussions, by way of example, it is stated that it can be formed out of polychloroprene elastomer compositions or compounds as indicated in the test "Introduction to Rubber Technology," Morton, Reinhold Publishing Company, 1959, pp. 340, 348. Also, in this example, the solid lubricant particles in the layers 20 and 24 can be polytetrafluoroethylene particles passing an 80 mesh but not passing a 100 mesh standard Tyler screen; they are held by the same composition as in the portion 26. These particles can be used in the surface layer 20 in the amount of 80% by weight of the elastomeric composition employed in this layer. Also, in this example, the layer 20 may be 0.015 inch thick and the layer 24 can be 0.030 inch thick.

The same bushing 10 may also, however, be formed utilizing other materials. Thus, for example, it can be created of an isobutylene polymeric composition compounded as indicated in the aforenoted test, pp. 319 to 332 and of molybdenum disulfide particles passing a 100 mesh standard Tyler screen and not passing a 200 mesh standard Tyler screen, utilizing a surface layer 20 about 0.030 inch thick containing about 50% by weight of solid lubricant particles and containing a transition layer about 0.040 inch thick.

By way of further example, it is considered that the bushing 10 can be created utilizing an organo-silicon elastomeric polymer, compounded as indicated in the aforenoted text, pp. 388–398, utilizing graphite solid lubricant particles passing an 80 mesh standard Tyler screen and not passing a 325 mesh standard Tyler screen in the amount of 70% by weight of the elastomeric composition within the surface layer 20, and by forming this surface layer 20 so that it is about 0.020 inch thick and by forming the transition layer 24 so that it is about 0.035 inch thick.

Those skilled in the art to which this invention pertains will realize that the foregoing examples are not to be taken as limiting this invention, inasmuch as various different elastomeric compositions of well-known varieties may be substituted for any of the specific compositions noted in these examples, and inasmuch as sizes and thicknesses may be varied within comparatively wide limits as discussed in the preceding. Similarly, various different solid lubricants, or mixtures of them as may be desired for specific purposes, may be substituted for the specific solid lubricants indicated in the examples.

Different methods may be used to manufacture articles in accordance with this invention. The precise method chosen for manufacturing any specific article will normally depend upon the configuration of the article. Thus, for example, where an article of uniform cross-sectional shape is desired it is possible to extrude such an article from a multi-barrel extrusion machine which is capable of feeding one stream of hot extruded material on the surface of another stream of hot extruded material before both streams simultaneously leave a common die. In this regard, reference is made to the various known types of extrusion equipment utilized for extruding differently colored elastomeric compounds into a single article. In general, equipment of this type can be utilized readily in creating articles as herein described with a minimum of engineering adaptation. Following such extrusion, an article as herein described, should, of course, be vulcanized or cured in accordance with conventional practice.

Articles falling within the scope of this invention also can be created by preforming bodies corresponding to the surface layer and to the principal portion of the finally desired article, and by then vulcanizing these bodies while holding them in contact with one another. Articles of this invention can be created from elastomeric compositions which, because of the use of appropriate catalysts vulcanize or cure at room temperature, by casting mixtures of such compositions and solid lubricant particles, as described, into a mold to a depth corresponding to the depth of a desired surface layer, by then casting such elastomeric compositions alone on top of the first layer cast, and by then allowing these two layers to polymerize or cure at the same time. Various other similar and related techniques can also be employed.

In all of these techniques, during the final polymerization and/or vulcanization a certain amount of migration of elastomer and lubricant particles will normally take place. Such migration usually is sufficient to create a transition layer which varies in solid lubricant particle composition as hereinbefore described. The amount of such migration may be partially controlled by appropriate variation of curing times and conditions.

I claim:

An elastomeric sealing bushing supporting a longitudinal movable member which passes through an opening in a wall, comprising a thick elastomeric body member having an opening extending therethrough for receiving said longitudinal movable member, said body member having on its outer peripheral surface a recess shaped to receive and to engage the periphery of the opening in said wall, said elastomeric body member being held under compression between said wall and said longitudinal movable member to maintain a seal between each side of said wall, said body member including a thin bearing layer disposed about said opening in said elastomeric body member and integrally connected therewith, said bearing layer having a lattice network of elastomeric material in which dry lubricant particles of irregular shape and of a size capable of passing an 80 mesh standard Tyler screen and incapable of passing a 325 mesh standard Tyler screen and which are immiscible with said elastomeric material are supported, said particles in said bearing layer being dispersed uniformly and making up by weight 50 to 80% of said bearing layer so that at most only a film of elastomeric material is exposed on the surface of said thin bearing layer, said bearing layer being from 0.015 to 0.030 inch thick to provide good wear characteristics and to impart sufficient rigidity to restrict the flow characteristics of said elastomeric material without significantly effecting the flexibility of the elastomeric body member, said body member including a transition layer of from 0.030 to 0.040 inch thick and a base layer, said transition layer positioned between said bearing layer and said base layer and integral therewith, and said transition layer having a substantially lower density of dry lubricant particles than said bearing layer, whereby stress and strain under load tending to separate said bearing layer from said base layer are reduced.

References Cited in the file of this patent

UNITED STATES PATENTS

| | | |
|---|---|---|
| 207,313 | Smith | Aug. 20, 1878 |
| 1,758,659 | Flury | May 13, 1930 |
| 1,820,220 | Geyer | Aug. 25, 1931 |
| 2,934,515 | Konkle | Apr. 26, 1960 |
| 3,011,219 | Williams | Dec. 5, 1961 |

FOREIGN PATENTS

| | | |
|---|---|---|
| 695,195 | Great Britain | Aug. 5, 1953 |